Figure 1:
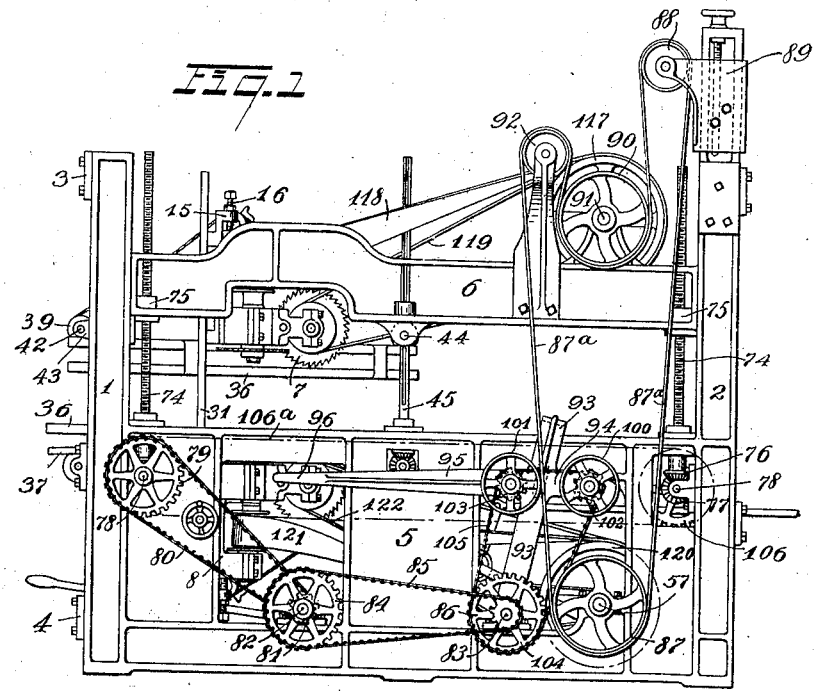

J. T. LECKENBY.
MACHINE FOR TRIMMING BOX CORNERS.
APPLICATION FILED MAY 25, 1909.

976,471.

Patented Nov. 22, 1910.
3 SHEETS—SHEET 1.

Witnesses
Nathan F. Fretter
Brannan B. West

Inventor
James T. Leckenby
By Bates, Fouts & Hull
Attys.

J. T. LECKENBY.
MACHINE FOR TRIMMING BOX CORNERS.
APPLICATION FILED MAY 25, 1909.

976,471.

Patented Nov. 22, 1910.
3 SHEETS—SHEET 2.

Witnesses:
Nathan F. Fretter.
Borman B. West.

Inventor.
James T. Leckenby
By Bates, Fouts & Hull
Attys

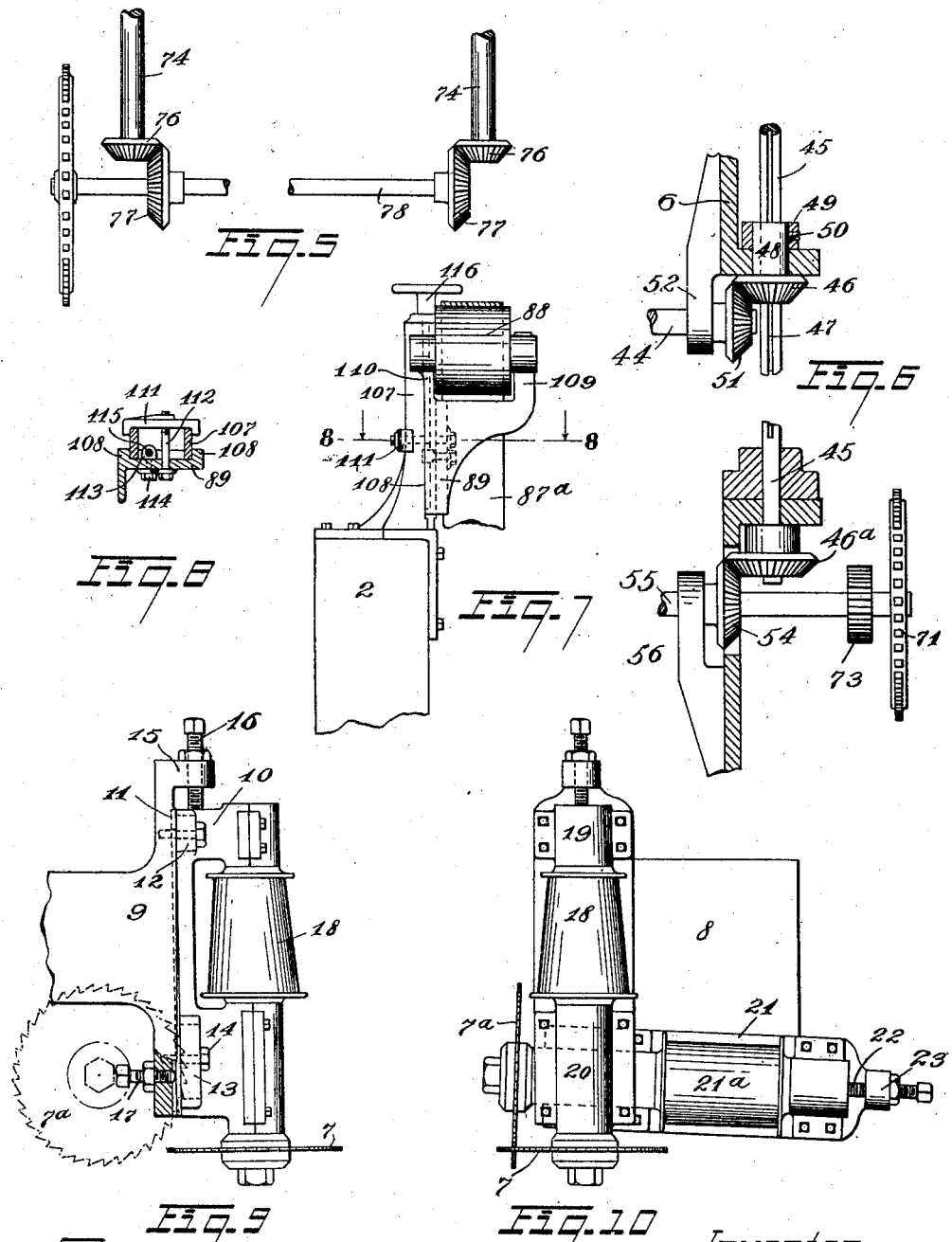

UNITED STATES PATENT OFFICE.

JAMES T. LECKENBY, OF HAMILTON, ONTARIO, CANADA.

MACHINE FOR TRIMMING BOX-CORNERS.

976,471. Specification of Letters Patent. Patented Nov. 22, 1910.

Application filed May 25, 1909. Serial No. 498,197.

*To all whom it may concern:*

Be it known that I, JAMES T. LECKENBY, a subject of the King of Great Britain, residing at Hamilton, in the county of Wentworth and Province of Ontario, Canada, have invented a certain new and useful Improvement in Machines for Trimming Box-Corners, of which the following is a full, clear, and exact description, reference being had to the accompanying drawings.

This invention relates to machines for trimming the corners of boxes, an instance of such machines being shown in my prior Patent No. 809,308, issued Jan. 9th, 1906.

It is the object of the present invention to improve upon structural features disclosed in my prior patent, and more particularly upon the mounting and adjustment of the saws; upon the means for raising and lowering the upper frame work and the means for stopping and starting the feed.

A further object of the invention is to provide a machine of this character with an improved construction of belt tightener, whereby the belt which is connected to a pulley mounted on the movable upper frame may be kept tight, and such tightness be preserved notwithstanding the vibrations of the machine.

With the above objects in view, the invention may be further defined as consisting of the combinations of elements embodied in the claims hereto annexed and illustrated in the drawings forming part hereof, wherein—

Figure 2:
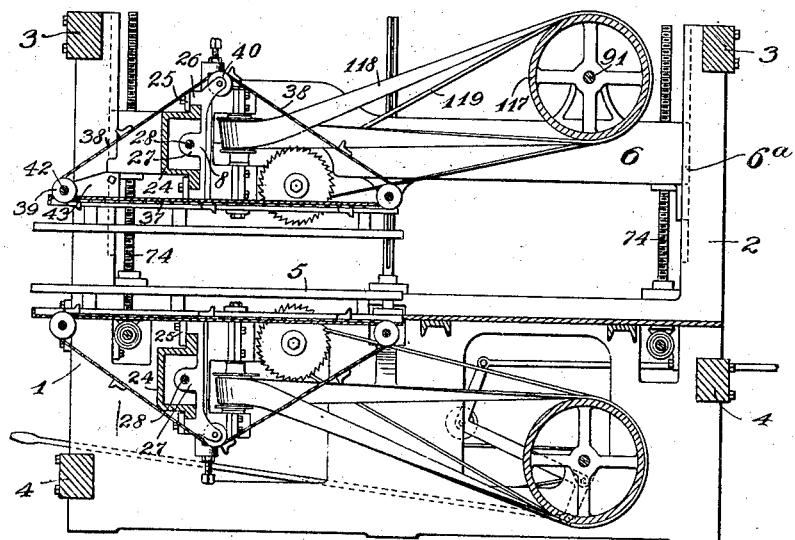
Figure 3:
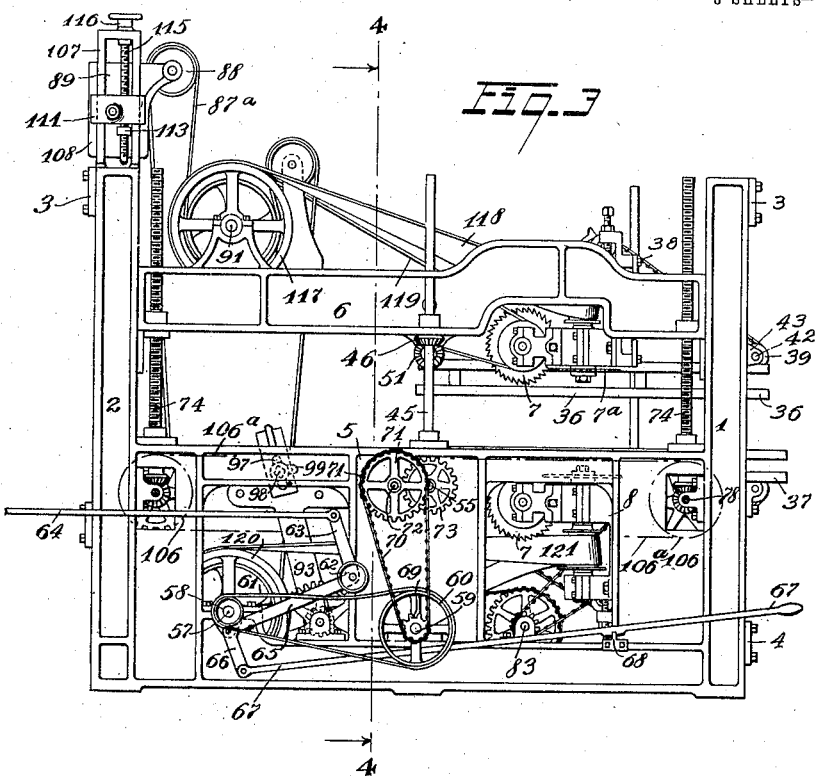
Figure 4:
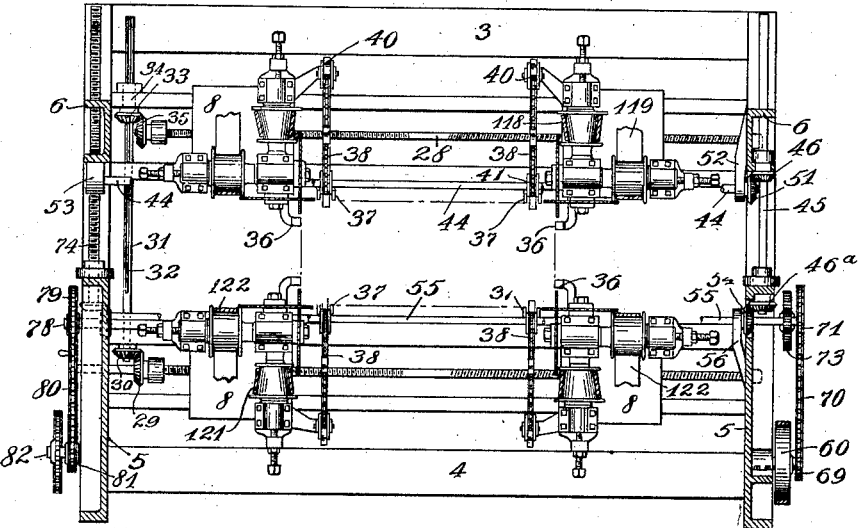

Figure 1 represents a side elevation of a machine constructed in accordance with my invention; Fig. 2, is a central vertical section of the machine shown in the preceding figure; Fig. 3 is a side elevation of the machine shown in Fig. 1,—the view being taken from the reverse side of the machine; Fig. 4 represents a transverse sectional view corresponding approximately to the line 4—4 of Fig. 3; Fig. 5 represents an enlarged detail of the mechanism for raising and lowering the upper frame work; Fig. 6 represents a detail, partly in section, and partly in elevation, of the means for driving the chains which feed the boxes through the machine; Fig. 7 represents a detail in elevation of the belt tightening device; Fig. 8 is a sectional detail corresponding to the line 8—8 of Fig. 7; Fig. 9 is an elevation of a saw-arbor mount; and Fig. 10 is an elevation of said mount, taken at right angles to Fig. 9.

The machine comprises generally four pairs of saws, each pair comprising a horizontally arranged and a vertically arranged saw and so located as to operate simultaneously upon the four corner edges of a box, with means for feeding boxes past and in operative relation to said saws; means for adjusting the saws and the feeding means to various dimensions of boxes; reversible power-driven mechanism for raising and lowering the upper frame, and means including a belt tightener for feeding the box feeding chains.

Describing the parts by reference characters, 1 represents the front and 2 the rear corner posts of a rigid frame work by which the various mechanisms are supported. These corner posts are connected by upper and lower transverse sills 3 and 4, as well as by lower side frame members 5.

6 denotes a pair of upper longitudinal sills which are slidably mounted in the corner posts 1 and 2, preferably by a mortise-and-tenon connection, as indicated at 6ª (Fig. 2). Two such sills are provided, one for each side of the machine. These sills 6 carry the upper saws, the upper box-feeding mechanism, and the drum pulley by means of which the upper saw arbors are rotated. The lower portion of the frame supports the drive shaft, the shafts and connections by means of which the upper frame work is raised and lowered, the lower saws, lower box feeding mechanism and the various shafting.

The upper and lower saws and the mouths therefor are identical in construction and arrangement, the only difference being that the upper saws are carried by the vertically adjustable sills 6, while the lower saw supporting members are fixed in position. As previously stated, there are four vertical saws, and four horizontal saws. The vertical saws are designated by the numeral 7 and the horizontal saws by the numeral 7ª. A horizontal saw and a vertical saw are on a common mount, which may be a casting having bearings arranged at substantially right angles to each other. The particular construction of the saw arbors, bearings and mount will be described with special reference to Figs. 2, 3, 9 and 10. The saw mount comprises a base 8 with a pair of projections arranged at substantially right angles to each other and projecting different distances from said base. One of these projections 9 forms a support for one of the saw arbors. The projections are each provided with a groove for the reception of a tongue projecting from the saw carriage or support as shown at 10, said tongue being indicated in dotted lines at 11, (Fig. 9). The carriage 10 is provided with ears 12 and 13, each of said ears being provided with an elongated slot for the reception of a bolt 14, said bolt being threaded into the projection 9 and having a head engaging the outer surface of the appropriate ear. The projection 9 is provided with a bracket 15 having an adjusting screw 16 extending therethrough and engaging the carriage 10. By slacking up the screws 14 and operating the screw 16 it will be apparent that the saw carriage may be adjusted longitudinally of the support and in a plane at right angles to the plane of the saw. For the purpose of varying the inclination of the saw arbor, a set screw 17 is provided, which extends through the projection 9 into the groove therein and engages the tongue on the carriage 10. By slacking up the bolts 14 and adjusting the screw 17, the carriage may be tilted, in the plane of the saw and at right angles to the arbor, to vary the inclination of the arbor with respect to the projection 9. The saw arbor is provided with a pulley 18, by means of which it may be driven. This arbor is mounted in bearings on its carriage, said bearings having removable journal caps 19 and 20. The base 8 is provided with a projection supporting a similar carriage 21 for the other saw arbor, the said arbor being arranged at substantially right angles to each other, as shown more particularly in Fig. 10. The carriage 21 is mounted in the same manner as carriage 10 and is adjusted in the same manner as the former carriage, the longitudinal adjustment of the carriage being indicated by the screw 22 and bracket 23.

The saw which is driven by pulley 21ª is shown at 7ª and, in the machine, four such saws are provided, the saws being arranged horizontally. The saw mounts 8 are reciprocably supported on the cross sills 24. These cross sills are preferably channel shaped, as will appear from Figs. 2 and 4, and the upper sill is connected at its opposite ends to the longitudinal sills 6 while the saw mounts are conveniently applied to said sills by means of plates 25 which overlap the flanges of the sills and are bolted to projections 26 carried by the mounts and embracing the outer edges of the sill flanges. Each mount 8 is provided with a lug 27 projecting into the hollow interior of the channel sill. An operating rod 28 is threaded into said lug. There are two saw mounts carried by each cross sill and the rod 28 in each of said sills is threaded into lugs projecting from both of the saw mounts on said sill. It will appear, by reference to Fig. 4, that the rods 28 may have their end portions reversely threaded for such lugs whereby, on rotation of a rod, the saw mounts connected thereto may be made to simultaneously approach or recede from each other.

For the purpose of simultaneously operating both rods 28, I provide the following construction. 29 denotes a bevel gear which is mounted on the lower rod. This gear meshes with a similar gear 30 on a vertical shaft 31. This shaft is provided with an elongated key-way 32 therein and is provided at its upper portion with a bevel gear 33, said gear having a hub and being provided with a key slidably fitting said keyway. The hub extends through a suitable bracket 34 carried by the upper longitudinal sill 6 and is provided above said bracket with a collar by means of which the hub and gear are supported. The gear 33 meshes with a gear 35 on the upper rod 28. From the foregoing description, it will be apparent that, by rotating the lower rod 28, the motion of said rod will be transmitted to the upper rod 28, whereby the saw mounts may be simultaneously adjusted to accommodate boxes of different width therebetween. At the same time, the manner of mounting the gear 33 on the shaft 31 permits the upper saw mounts to be raised with the sills 6 without destroying the driving relation between the upper and lower rods. The details of the construction by which this driving engagement is maintained are substantially the same as those employed for driving the upper feed chains, (see Fig. 6), and a further detailed description of said construction is unnecessary.

The saws have associated therewith guides for the boxes and feeding chains coöperating with said guides and said saws for carrying the boxes in operative relation to the saws. Each guide comprises a lateral member 36 which is connected to a saw mount and extends longitudinally of the machine. The members 36 engage the sides of the box. In addition to the member 36, each guide comprises a trough 37, there being two troughs for the top side of the box and two troughs for the bottom side of the box. The guide members 36 and 37 which are connected to the upper saw mounts will be vertically and laterally adjustable, while the guides connected to the lower saw mounts are only laterally adjustable. The upper troughs are inverted and each trough forms a guide for a feed chain 38. Each of these chains extends around three sprocket wheels 39, 40 and 41 arranged in triangular form. The sprocket wheels 39 are mounted on a shaft 42 which is carried in bearings 43 depending from the sills 6, and the sprocket wheels 41 are mounted on a shaft 44 which is supported in like manner from the sills 6.

In order to drive the feed chains, I employ the following construction:—45 denotes a vertical shaft which is provided at its upper end with a bevel gear 46 by means of which it is driven (see more particularly Figs. 1, 3, 4 and 6). This shaft is located at one side of the machine and has its upper end projecting through the flanges of the channel sill 6. The bevel gear 46 is provided with a key fitting in a longitudinal key way 47 in shaft 45 and with a hub 48 projecting through the lower flange of the sill 6. This hub is provided with a collar 49 by means of which and a set screw 50 the gear 46 is rotatably supported from the sill 6. This gear meshes with a bevel gear 51 on a shaft 44, said shaft being supported by suitable hangers 52 and 53 carried by the sills 6. The shaft 45 is provided at its lower end with the bevel gear 46$^a$ which is driven by a bevel gear 54 mounted on a shaft 55. This shaft 55 is mounted in suitable supports 56 carried by the lower side frames and is driven as follows:

57 denotes the main drive shaft of the machine. This shaft is provided with a pulley 58.

59 denotes a shaft having a pulley 60, being connected to the former pulley by the belt 61. This belt is normally too slack to cause the driving of shaft 59 by shaft 57. To tighten the belt I provide a belt-tightening roller 62 mounted on a lever, said lever having an arm 63 provided with an operating rod 64 and an arm 65 which is pivoted to any suitable portion of the frame. 66 denotes another arm, projecting at an angle from arm 65 and having an operating handle 67. This operating handle is provided with a notch adapted to receive a locking projection 68 by means of which the roller 62 may be locked out of engagement with the belt. Shaft 59 is provided with a sprocket 69, by means of which and a chain 70 and a sprocket 71, the motion of shaft 59 is transmitted to a shaft 72. Shaft 72 is provided with a pinion meshing with a gear 73 on the shaft 55.

From the construction illustrated and described, it will be apparent that, by operating the rod 64 and handle 67, the motion of the shaft 57 is transmitted through a system of reduction gearing to the shaft 55. The motion of this shaft in turn is transmitted to the feed chains.

Adjacent to each corner post there is mounted a feed screw 74. These screws are conveniently supported by the lower side frames 5 and are threaded through projections 75 formed on the longitudinal sills 6. Each screw has at its lower end a bevel gear 76 meshing with a corresponding bevel gear 77 on a transverse shaft 78. Two such transverse shafts are shown, and each shaft has thereon a pair of the bevel gears 77, each gear meshing with a bevel gear 76. The shaft 78 at the front of the machine is provided with a sprocket 79 by means of which and a chain 80, extending around a sprocket 81, it may be driven from the shaft 82. The shaft 82 is connected with a shaft 83 by means of a sprocket 84, chain 85, and sprocket 86. The shaft 83 is driven from the main shaft 57 as follows: This shaft 57 is provided with a pulley 87 and at the upper end of the machine are located a belt-tightening pulley 88 carried by an adjustable bracket 89, a pulley 90 on shaft 91 supported from the longitudinal sill 6 and a pulley 92 also carried by one of the sills 6. A belt 87$^a$ extends around all these pulleys, as shown in Fig. 1.

93 denotes a lever, the lower end of which is conveniently pivoted on the shaft 83. This lever is provided with a pair of arms extending in opposite directions from the central portion thereof and designated by 94 and 95. One of these arms is extended and provided with a suitable operating handle 96. The central portion 93 of the lever extends up alongside of one of the lower side frame members 5 and overhangs the same. This lever is provided with a slot 97 for the reception of a headed bolt 98 which extends through said slot and through an elongated slot 99 in said side frame member. These two slots and the bolt extending therethrough retain the lever in its proper position with relation to the side frame, allowing it to rotate on its pivot (which may be the shaft 83) and limit the throw of the lever so that either one of the pulleys 100, 101 carried thereby may engage the belt 87$^a$. The pulleys 100, 101 are mounted on stub shafts carried by the lever arms 94 and 95 respectively. Each of these stub shafts has thereon a sprocket shown at 102, 103 respectively.

104 denotes a sprocket on the shaft 83 and 105 a chain extending around said sprocket and the two sprockets 102 and 103.

From the construction described, it follows that, by operating the lever handle 96 in one direction, the pulley 101 may be brought into engagement with belt 87$^a$, and that this will cause the shaft 83 to be driven in the appropriate direction, and that, by operating the lever handle 96 in the opposite direction, the pulley 100 will be brought into contact with said belt and the shaft 83 will be rotated in the opposite direction from that given it by the pulley 101. Through the connections described, the shaft 78 will be driven in one direction or the other according to the manner in which the lever handle 96 is operated. The front and rear shafts 78 are connected by means of sprockets 106 and a chain 106$^a$, whereby both longitudinal side members 6 may be elevated and lowered simultaneously.

Reference has been made to the belt-tightening pulley 88. The arrangement of pulleys 87, 88, 90 and 92 is such that the belt is maintained substantially tight during the excursions of the sills 6. In order to insure the tightness of the belt under all conditions, I have provided the bracket 89, which is carried at the top of one of the posts 2, and means for adjusting said bracket vertically to vary the distance between the pulleys 88 and 90; also means for locking the pulley 88 in its adjusted position. The construction by which this is accomplished will be described with particular reference to Figs. 1, 3, 7 and 8. From these figures, it will appear that the bracket 89 is slidably mounted upon a U-shaped frame 107 carried on top of one of the posts 2. This bracket is provided with side flanges 108 adapted to reciprocably embrace the opposite members of frame 107. One of these side flanges is widened and forked to provide bearings for the pulley 88 as shown at 109 and 110.

111 denotes a clamp which is applied to the members of frame 107 opposite the bracket 89. This clamp is connected to the bracket 89 by means of a bolt 112 extending through the hollow space inclosed by the bracket and the two side members of the frame 107.

113 denotes a threaded lug which is carried by the bracket 89, preferably projecting from the end of a bolt 114 extending through said bracket into the space included between the side members of frame 107.

115 denotes a screw having a head 116 bearing on top of the frame 107 and threaded through the lug 113, the lower end of said screw resting on top of the post 2. It will be apparent that, by rotating the screw 115, the bracket 89 will be raised or lowered, according to the direction of rotation, while the construction of the clamp 111 and the bracket permits the rise and fall of the bracket and clamp on the frame. By tightening the bolt 112, the position of the bracket will not be altered by the jarring of the machine.

The shaft 91 has mounted thereon the drum pulley 117, by means of which the upper saw arbors are driven. The pulleys for driving the vertical arbors are tapered, as shown more particularly in Figs. 2 and 10. These pulleys are driven by means of belts 118. The pulleys for driving the horizontal saw arbors are driven from the same drum pulley 117, by means of belts 119. The drum pulley for the lower saws is shown at 120 and is preferably mounted on the main shaft 57. The lower vertical saw arbors are shown as driven from said pulley belts 121 and the lower horizontal arbors are driven from the same pulley by belts 122.

Having thus described my invention, what I claim is:

1. In a machine of the character described, the combination of box trimming means, means for feeding boxes in operative relation thereto, a shaft for driving said means, a pulley on said shaft, a drive shaft having a pulley thereon, a loose belt connecting said pulleys, and means for tightening said belt, said means comprising a lever having a pair of operating arms projecting in opposite directions therefrom and said lever being pivoted adjacent to one of said arms, a roller carried by said lever at a point remote from the pivot thereof, and adapted to engage said loose belt and a rod connected to one of said operating arms to operate the belt tightening means.

2. In a machine of the character set forth, the combination of box trimming means, means for feeding boxes in operative relation thereto, a shaft for driving said means, a drive shaft having a pulley thereon, an intermediate shaft also having a pulley thereon, connections between the intermediate shaft and the first mentioned shaft, a belt extending around said pulleys, and means for tightening said belt, said means comprising a lever having a roller thereon, a rod connected with said lever for rocking the same, a second rod connected with said lever on the opposite side of its pivot from the first-mentioned rod, whereby the belt tightening device may be operated by the rod, and means adapted to engage the latter rod to retain the roller out of contact with the belt.

3. In a machine of the character set forth, the combination of an upper pair of saw mounts and a lower pair of saw mounts, an arbor for each of said saw mounts, a pulley on each arbor, a frame supporting the upper pair of saw mounts, a frame supporting the lower pair of saw mounts, means for adjusting the saws on the upper frame toward and from each other, means for adjusting the saws on the lower frame toward and from each other, a drum pulley mounted on the upper frame, a drum pulley mounted on the lower frame, and a pair of belts on each of said drum pulleys, each belt on said pulleys extended around the pulley on the corresponding saw arbor.

4. In a machine of the character set forth, the combination of a pair of saw mounts, means for adjusting the mounts toward and from each other, a pair of rotary saws carried by each mount, a pulley for rotating each saw, a drum pulley, a pair of belts extending around said drum pulley and each extending around a saw arbor pulley, and means for driving the drum pulley.

5. In a machine of the character described, the combination of an upper and a lower pair of saw mounts, a vertically adjustable frame upon which one pair of saw mounts are carried, a threaded rod supported by the said frame and engaging a threaded portion of one of the upper mounts, a threaded rod mounted adjacent the lower mounts and engaging a threaded portion of one of the lower mounts, connections for driving one of the said rods from the other, means whereby such driving connection may be preserved when the upper frame is adjusted, a shaft, and connections between said shaft and one of said rods.

6. In a machine of the character described, the combination of an upper and a lower pair of saw mounts, a rod extending through the upper saw mounts and having reversely threaded portions engaging both of said mounts, a rod extending through the lower saw mounts and having reversely threaded portions engaging both of said mounts, means for driving one of said rods, and connections between said rods whereby both will be driven simultaneously.

7. In a machine of the character set forth, the combination of an upper and a lower pair of saw mounts, a rod threaded into one of the upper mounts, a second rod threaded into one of the lower mounts, a vertically adjustable frame for one pair of mounts, a drive shaft, connections between the same and one of the rods for driving the latter, a bevel gear on said rod, a shaft having a pair of bevel gears thereon, one of said gears meshing with the bevel gear on the rod and the other bevel gear being reciprocably connected with the vertical shaft, a bevel gear on the other rod, and means carried by the adjustable frame for retaining the latter gear and the sliding gear in mesh with each other.

8. In a machine of the character set forth, the combination of a vertically adjustable frame, saws carried thereby, rods threaded into said frame, a shaft having a driving connection with one of said rods, a continuously driven shaft having a pulley and belt for driving the saws, a shaft having a driving connection with the first mentioned shaft and provided with a sprocket, a pivoted lever, a pair of shafts carried thereby, a roller on each shaft, a sprocket on each of the latter shafts, a chain extending around all of said sprockets, means whereby said lever may be rocked to bring either of said rollers into engagement with said belt, and means for driving all of said rods from the first mentioned rod.

9. In a machine of the character set forth, the combination of an adjustable frame, a rotary saw carried thereby, a shaft, a belt driven thereby to rotate said saw, and means for adjusting said frame, said means comprising a frame-operating shaft, a lever having a pair of shafts thereon, a roller on each shaft, said rollers being arranged on opposite sides of said belt, a driving connection common to both of the latter shafts and to the frame operating shafts, and means whereby said lever may be rocked to bring one or the other of the rollers thereon into engagement with said belt.

10. In a machine of the character set forth, the combination of an adjustable frame, a saw carried thereby, a shaft, a belt driven by said shaft for operating said saw, a shaft for elevating and depressing said frame, and means for driving said shaft from said belt, said means comprising a pair of rollers, said roller being arranged on opposite sides of the belt, a shaft for each of said rollers adapted to be driven thereby, a connection between both of the latter shafts and the frame-operating shaft, and means for bringing one or the other of said rollers into engagement with said belt.

11. The combination of a saw mount, said mount having a pair of projections and said projections being arranged at substantially right angles to each other, a movable saw support mounted on each of said projections, a saw arbor journaled in each support, means for adjusting said carriage longitudinally of their respective projections, and means for adjusting said supports toward and from their respective projections.

12. The combination of a saw mount and a pair of saw supports thereon, each of said supports having a saw arbor, said arbors being arranged at substantially right angles to each other, means for adjusting each of said supports longitudinally along said mount, and means for varying the angle between said supports and said mount.

13. The combination of a saw mount and a pair of saw supports thereon, each of said supports having a saw arbor, said arbors being arranged at different distances from the base of the mount and having their planes intersecting, means for adjusting each of said supports longitudinally along said mount, and means for varying the angle between said supports and said mount.

In testimony whereof, I hereunto affix my signature in the presence of two witnesses.

JAS. T. LECKENBY.

Witnesses:
F. R. WALTERS,
M. J. JEFFREY.